US010051995B2

(12) United States Patent
Buckley et al.

(10) Patent No.: US 10,051,995 B2
(45) Date of Patent: Aug. 21, 2018

(54) ATMOSPHERIC ROTISSERIE BURNER WITH CONVECTION HEATING

(71) Applicant: 7794754 CANADA INC., Lachine (CA)

(72) Inventors: Kenneth Michael Buckley, Pointe Claire (CA); Cristian Mitroi Banu, Dorval (CA)

(73) Assignee: 7794754 CANADA INC., Lachine (CA)

( * ) Notice: Subject to any disclaimer, the term of this patent is extended or adjusted under 35 U.S.C. 154(b) by 173 days.

(21) Appl. No.: 14/858,098

(22) Filed: Sep. 18, 2015

(65) Prior Publication Data

US 2017/0079475 A1      Mar. 23, 2017

(51) Int. Cl.
  *A47J 37/04*   (2006.01)
  *A47J 37/06*   (2006.01)
  *A23L 5/10*    (2016.01)

(52) U.S. Cl.
  CPC .............. *A47J 37/042* (2013.01); *A23L 5/17* (2016.08); *A47J 37/0641* (2013.01); *A23V 2002/00* (2013.01)

(58) Field of Classification Search
  CPC .... A47J 37/041; A47J 37/042; A47J 37/0641; A47J 37/0647; A47J 37/0713; A47J 37/0745
  See application file for complete search history.

(56) References Cited

U.S. PATENT DOCUMENTS

| 2,350,948 | A | | 6/1944 | Walker | |
|---|---|---|---|---|---|
| 2,476,579 | A | * | 7/1949 | Becker | F24C 1/14 126/90 R |
| 2,626,341 | A | * | 1/1953 | Bolling | A21B 1/22 219/395 |
| 3,265,057 | A | * | 8/1966 | Horne | F24C 3/042 126/92 B |
| 3,384,068 | A | * | 5/1968 | Perry | F24C 15/322 126/21 A |
| 3,437,085 | A | | 4/1969 | Perry | |
| 3,504,620 | A | * | 4/1970 | Gerhardt | A47J 37/042 99/427 |
| 3,698,377 | A | | 10/1972 | Smith | |
| 3,831,579 | A | | 8/1974 | Tamada et al. | |

(Continued)

FOREIGN PATENT DOCUMENTS

DE           3304059          4/1994

*Primary Examiner* — Jorge Pereiro
(74) *Attorney, Agent, or Firm* — Cherskov Flaynik & Gurda, LLC

(57) ABSTRACT

The present invention provides a device for cooking food that has a cooking cavity defined by a front wall, a back wall that opposes the front wall, two opposing side walls, a ceiling, and a floor that opposes the ceiling; a substrate for supporting a food item, the substrate substantially enclosed by the cavity; a first plenum spanning between the two opposing side walls, said plenum comprising a first segment proximal to the back wall, a second segment proximal to the ceiling, and at least one third segment that joins the first segment and the second segment; a second plenum positioned proximal to but medially displaced from the first plenum; a flame heating element located between the first plenum and the second plenum; and at least one air movement device located proximal to a region in which the front wall and ceiling intersect.

9 Claims, 7 Drawing Sheets

(56) References Cited

U.S. PATENT DOCUMENTS

| | | | | |
|---|---|---|---|---|
| 4,062,983 | A | 12/1977 | Roderick | |
| 4,510,854 | A | 4/1985 | Robertson | |
| 4,671,250 | A | 6/1987 | Hurley et al. | |
| 4,773,319 | A | 9/1988 | Holland | |
| 4,834,063 | A | 5/1989 | Hwang | |
| 4,865,864 | A * | 9/1989 | Rijswijck | A47J 37/047 219/400 |
| 4,867,132 | A | 9/1989 | Yencha | |
| 4,926,837 | A * | 5/1990 | Parker | F24C 1/04 126/21 A |
| 4,928,663 | A | 5/1990 | Nevin et al. | |
| 4,934,260 | A | 6/1990 | Blevins | |
| 4,971,023 | A | 11/1990 | Martinez | |
| 4,979,436 | A | 12/1990 | McGowan | |
| 5,044,262 | A * | 9/1991 | Burkett | A47J 37/042 219/492 |
| 5,533,444 | A | 7/1996 | Parks | |
| 5,545,874 | A | 8/1996 | Hansson | |
| 5,598,769 | A * | 2/1997 | Luebke | A47J 37/042 99/395 |
| 5,639,497 | A * | 6/1997 | Bedford | A47J 37/042 426/233 |
| 5,704,278 | A | 1/1998 | Cross | |
| 6,131,559 | A | 10/2000 | Norris et al. | |
| 7,235,763 | B2 | 6/2007 | Christiaansen | |
| 7,297,904 | B2 | 11/2007 | Paller | |
| 7,409,904 | B2 * | 8/2008 | Blumel | A21B 1/46 99/427 |
| 7,422,009 | B2 | 9/2008 | Rummel et al. | |
| 7,543,529 | B1 | 6/2009 | Carpenter et al. | |
| 8,294,070 | B2 | 10/2012 | McNamee et al. | |
| 8,776,675 | B1 | 7/2014 | Meris et al. | |
| 8,887,627 | B1 * | 11/2014 | Baik | A47J 37/0709 126/41 B |
| 9,488,377 | B2 * | 11/2016 | Wie | F24C 15/322 |
| 2002/0108502 | A1 * | 8/2002 | Kim | A47J 37/0709 99/419 |
| 2005/0098167 | A1 | 5/2005 | Sikes | |
| 2009/0188396 | A1 * | 7/2009 | Hofmann | G01K 1/024 99/342 |
| 2014/0212821 | A1 * | 7/2014 | Banu | F23N 5/242 431/6 |
| 2015/0369493 | A1 * | 12/2015 | Banu | F24C 15/04 126/21 R |

* cited by examiner

SECTION 2D-2D

SECTION 3-3

SECTION 4-4

ATMOSPHERIC ROTISSERIE BURNER WITH CONVECTION HEATING

BACKGROUND OF THE INVENTION

1. Field of the Invention

This invention is directed to a cooking apparatus that has a flame heating element and convection heating fans.

2. Background of the Invention

Rotisserie ovens traditionally cook food on a multitude of rotating spits contained within the oven's cooking cavity. However, loading multiple food items, such as chickens, on each spit is time and labor intensive. Thus, many rotisserie operators prefer to place the food items in baskets. The baskets, however, maintain their orientation throughout their rotation in the cooking cavity, similar to the way cars on a Ferris wheel maintain their orientation while the Ferris wheel spins. This prevents passengers and food items from falling out of their respective baskets, but it also prevents food in the rotisserie from cooking evenly on all sides.

In order to improve the evenness of cooking, some rotisseries attempt to add an element of convection heating. These rotisseries utilize electric, radiative heating elements to heat the air within the cooking cavity. The heated air is then circulated by fans in the rotisserie.

In order to maximize the effects of an electric, radiative heating element, the element should be exposed to the food product so that infrared waves from the element can participate in the cooking process. However, because the electric heating elements are susceptible to burnout when exposed to grease and oil from the food, they are typically placed near or on the ceiling of the rotisserie. Careful fan placement is also required to avoid their clogging or malfunction caused by the grease and oil. Suboptimal placement of heating elements and fans produce uneven temperatures throughout the cavity.

Gas fired rotisseries use a flame heating element wherein the element resides near the lower rear of the cooking cavity. This placement provides some natural convection as a result of the combustion process and differences in air temperature between the bottom and top of the cooking cavity. Additionally, the position of the flames is aesthetically pleasing for customers that view the food as it is being cooked in the rotisserie. Some gas rotisseries also have an infrared burner located near the top of the cooking chamber, and angled towards the food product being cooked. These burners are extremely susceptible to moisture and clogging and not ideally suited for auto-wash systems.

Forced-air convection rotisseries are a popular alternative to electric and flame heaters. While flame heating is desirable both aesthetically and taste-wise, the fans used to circulate air in forced convention rotisseries will extinguish flame heating elements, or else divert the flames away from the flame sensor, thereby causing a false loss of ignition signal. When the flame becomes extinguished, the temperature in the cooking cavity can quickly decrease, which increases the cooking time.

Therefore, there is a need in the art for a rotisserie that allows for spit and/or basket-loading of food items. The rotisserie should provide an element of forced convection heating so as to assure evenness of cooking. The rotisserie should also use a flame heating element to achieve the technical and aesthetic advantages of flame cooking.

SUMMARY OF THE INVENTION

An object of the present invention is to provide a flame heated rotisserie that overcomes many of the drawbacks of the prior art.

Another object of the present invention is to provide an efficient rotisserie oven for cooking aesthetically- and gastronomically-pleasing food. A feature of the invention is the combination of forced convection heating and flame heating. An advantage of the present invention is that the rotisserie is able to utilize the technical and aesthetic advantages of flame heating while also realizing the benefits of convection heating. In an embodiment of the invention, convection fans are placed opposite the flame such that the flame cooks one side of the product while the forced convection cooks the other side of the product Yet another object of the present invention is providing a method for cooking food simultaneously using forced air convection and flame broiling. A feature of the present invention is imposing a webbing between the flame and convection air fans. The webbing provides an air shield to block the full force of the air from destabilizing the flame in the heating element while allowing for the theater of the flame to remain visible. An advantage of the invention is that the efficiency of forced air convection and the aesthetics of flame broiling are simultaneously obtained while avoiding flame-out situations. Simultaneously, the webbing heats up from the flame and acts as a radiator, radiating heat onto the product as the product passes in front of the webbing.

Another object of the present invention is to provide a more uniform temperature within a rotisserie cooking cavity through forced convection heating. A feature of the present invention is that a flame is enclosed within a plenum defined by an air shield and by a hot air deflector panel. Another feature of the present invention is that the air shield features a plurality of adjustable windows above the base of the flames so that air from the fans at the top of the cooking cavity can circulate the hot air from the flame heating element at the bottom of the cooking cavity through the plenum. An advantage of the present invention is that this circular flow of air within the cooking cavity helps to homogenize the temperature within the cavity more efficiently than conventional rotisserie ovens.

Another object of the present invention is to ease the labor intensity and decrease the time required to load a rotisserie oven. A feature of the present invention is that it accommodates both spits and rotating baskets. An advantage of the present invention is that the retention of spits accommodates more traditional food preparers and provides traditional theater of spit roasting. In contrast, food items are simply placed in baskets while the baskets are in the rotisserie. In other words, baskets obviate the need to first skewer the food items on a spit outside the rotisserie before loading spits into the rotisserie.

Still another object of the present invention is to improve the evenness of cooking in rotisserie ovens utilizing rotating baskets. A feature of the present invention is the capability to use forced air convection heating simultaneously with flame heating to provide a uniform temperature throughout the cooking cavity. An advantage of the present invention is that the food items in the rotisserie are cooked evenly on all sides, display an aesthetically pleasing browning, and take less time to cook than other conventional rotisseries.

Briefly, the present invention provides a device for cooking food, the device comprising a cooking cavity, wherein the cavity is defined by a front wall, a back wall that opposes the front wall, two opposing side walls, a ceiling, and a floor that opposes the ceiling; a substrate for supporting a food item, the substrate substantially enclosed by the cavity; a first plenum spanning between the two opposing side walls, said plenum comprising a first segment proximal to the back wall, a second segment proximal to the ceiling, and at least one third segment that joins the first segment and the second segment; a second plenum positioned proximal to but medially displaced from the first plenum; a flame heating element located between the first plenum and the second plenum; and at least one air movement device located proximal to a region in which the front wall and ceiling intersect.

The invention also provides a method for cooking food, the method comprising maintaining fluid communication between the food and an open flame in a forced air convection environment.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention is directed to a cooking apparatus, such as a rotisserie oven, having a flame heating element and fans so as to cook food using convection heating. A salient feature of the invention is that it is an atmospheric heating system whereby combustion is not done using forced air, but rather through natural convection. Both radiant energy from a black body wall and moving hot air are simultaneously used to cook food. The sources of these two energies are separate from each other within the cooking chamber. This allows for the preparer to situate food such that a thicker side of the food faces the higher source of energy. For example, meats having a thicker side would be loaded into the cooking chamber such that the thicker side always faces the black body wall, described infra as a webbing acting as an air shield.

Figure 1:
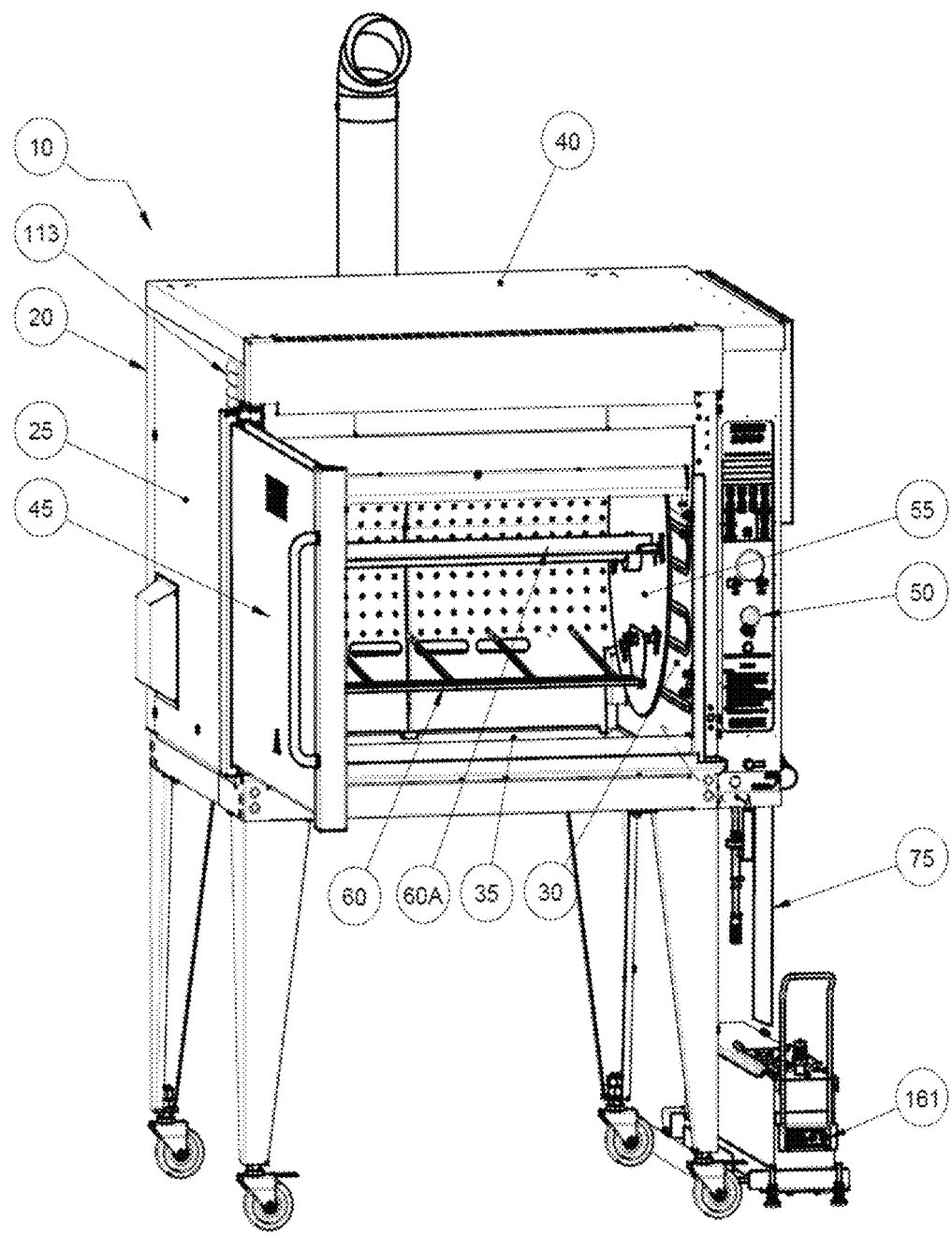
FIG. 1 depicts a front perspective view of the exterior cooking apparatus in accordance with features of the present invention.

As can be seen in FIG. 1, the cooking apparatus, designated as numeral 10, comprises a front wall 15, back wall 20 (shown in FIG. 2A), a first sidewall 25 (shown FIG. 2A), a second sidewall 30, a floor 35, and a ceiling 40. The front wall 15 typically features at least one door panel 45 that opens upwardly, downwardly, or to either side. Optionally, a plurality of leaves can be utilized as a door, each of the leaves arranged during oven operation to optimize air flow.

FIG. 1 depicts one door panel 45 that opens outwardly from the right to the left side of the cooking apparatus 10. However, the door leaf may open from the left, the top, the bottom edges of the door jamb. Other configurations include a gate design whereby opposing edges of two door leaves meet at the middle of the door opening, along a vertical line bisecting the opening, or at the middle of the door opening along a horizontal line bisecting the opening.

The front wall 15 may feature a control panel 50 that allows a user to control such functions as cooking time, cooking temperature, and automatic wash.

On the interior of the cooking apparatus 10, a rotating assembly 55 is suspended between the first sidewall 25 and second sidewall 30. The rotating assembly 55 preferably includes a plurality of baskets support beams 60 to hold food items; however, the rotating assembly 55 could also include spits 60, skewers, or other devices for holding food with or in place of the baskets. As such, a plurality of both spits and baskets can be utilized simultaneously in the invented device.

Figure 7:
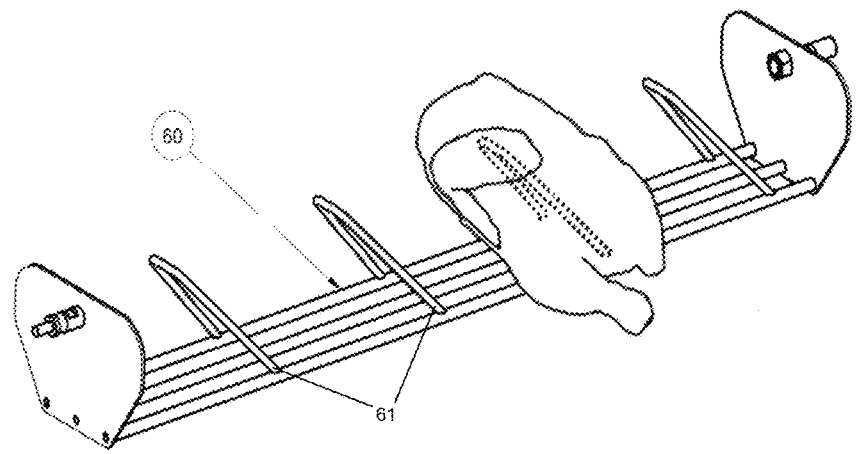
FIG. 7 is a detail view of food support structures, in accordance with features of the present invention.

The baskets illustrated in FIG. 1 and FIG. 7 show a number of angled supports 61 upon which the cavity of the bird is placed. FIG. 7 shows a bird situated on one of the supports, the latter of which is depicted in phantom. The supports 61 may be integrally molded with the support beams 60 and configured such that the bird faces the spit support (55) and angled at approximately 45-60 degrees relative to the support beam 60. These angles optimize the longitudinally extended space defined by the supports so that more food can be stacked thereon. Also, the angles help direct juices draining from the inside of the birds to specific regions of the drain pain lining the floor of the oven. In the embodiment depicted in FIGS. 1 and 7, the integrated product supports are angled from right to left and do not extend to the rear. Baskets may be suspended from the supports. Other designs for baskets could be envisioned which allow product to be placed laying in the basket.

The baskets are in rotatable communication with an axle or plurality of axles. A first end of each end of each axle is rotatably received by a chuck, or other substrate. The chuck or substrate is positioned in close spatial relationship to the nearest side wall to it and rotates relative to the side walls.

Figure 2A:
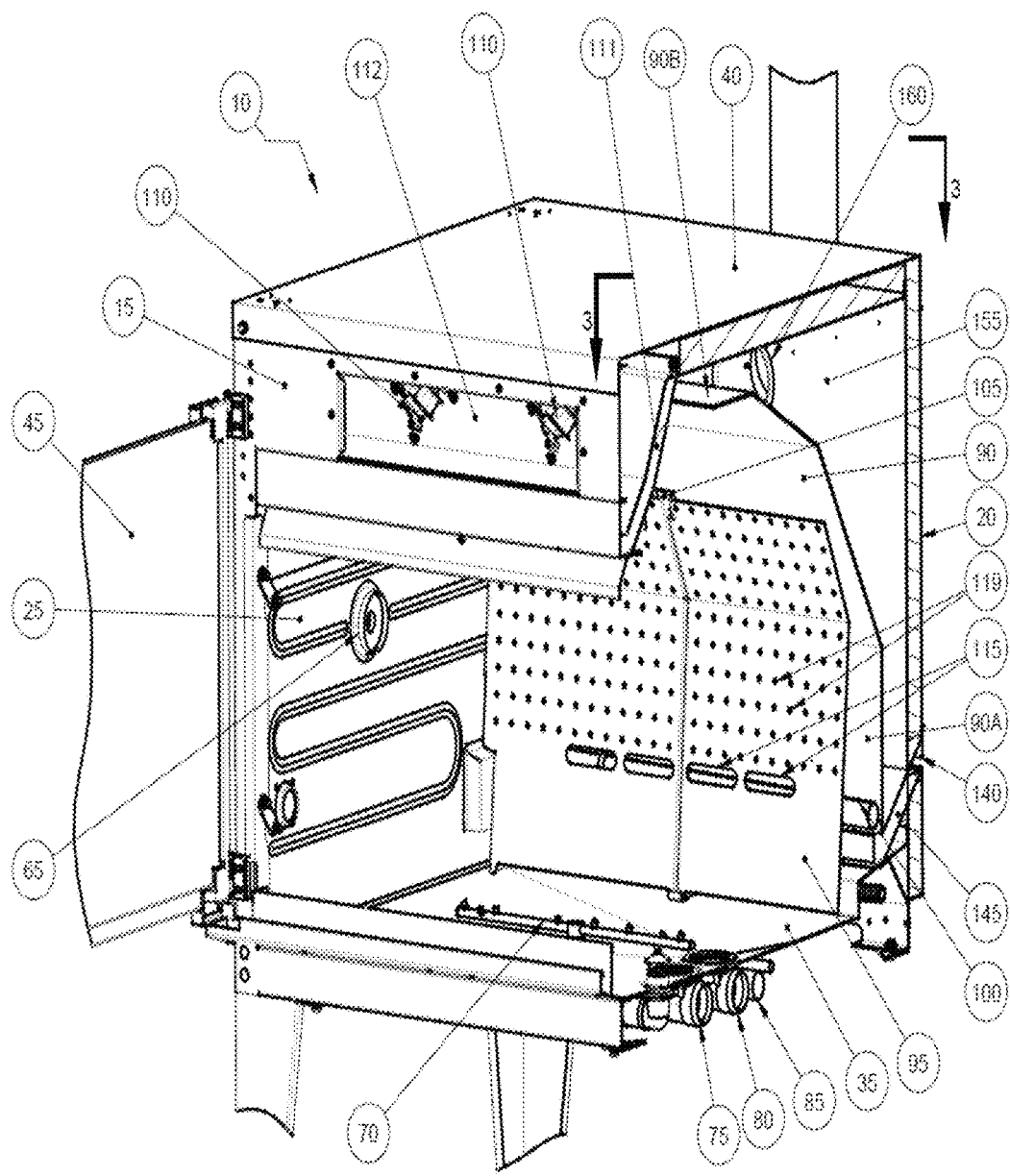
FIG. 2A depicts a partial cutaway perspective view of the interior of the oven.

FIG. 2A depicts an interior view of the cooking apparatus 10. The interior surface of the first sidewall 25 features the aforementioned chuck or mount 65 for the rotating assembly 55. Also depicted is a serpentine-shaped, medially protruding ridge 27 integrally molded with the wall 25. This ridge 27 is continuous and extends to the front and back of the oven in an alternating fashion. It provides a means for allowing the wall to expand and contract given varying temperatures during operation and cooling. The ridge therefore aids in preventing deformation that would otherwise occur as a result of such thermal expansion and contraction.

The floor 35 features an optional rotating spraying arm or arms 70 for a rotisserie wash function (if the rotisserie is so equipped). Additionally, the floor contains a series of drains (75, 80, 85) to facilitate fat, oil, and grease (FOG) removal and drainage of the cleaning soap and water. One drain 75 serves as the drain for the cooking effluent FOG's. A second (this one covered with a screen 81) drain 80 is for effluent generated by the auto wash system (80) (the cover is perforated to act as a course filter to protect the auto clean components from food particles), and a third drain 85 functions as a grease and washing fluid overflow. Also depicted is a grease drain shield 81 which prevents water and degreaser, provided and liberally applied during the auto-clean cycle, from entering the grease drain and contaminating the grease. The drain shield 81 is frustonically configured with its flared portion positioned inferior from its apex or pointed end.

An embodiment of the invention provides a grease collection system, such that one of the drains 75 is directed to a collection reservoir (161). Optionally, heated extensions of this drain 75 are provided, the distal, depending end of this extension defining a means of egress of unadulterated cooking grease for later recycling. The depending end is in fluid- and thermal-communication with the interior of the oven so as to remain heated for a time sufficient to facilitate grease flow without clogging. This drain may be constructed of a more thermally conductive material such as aluminum.

Figure 3A:
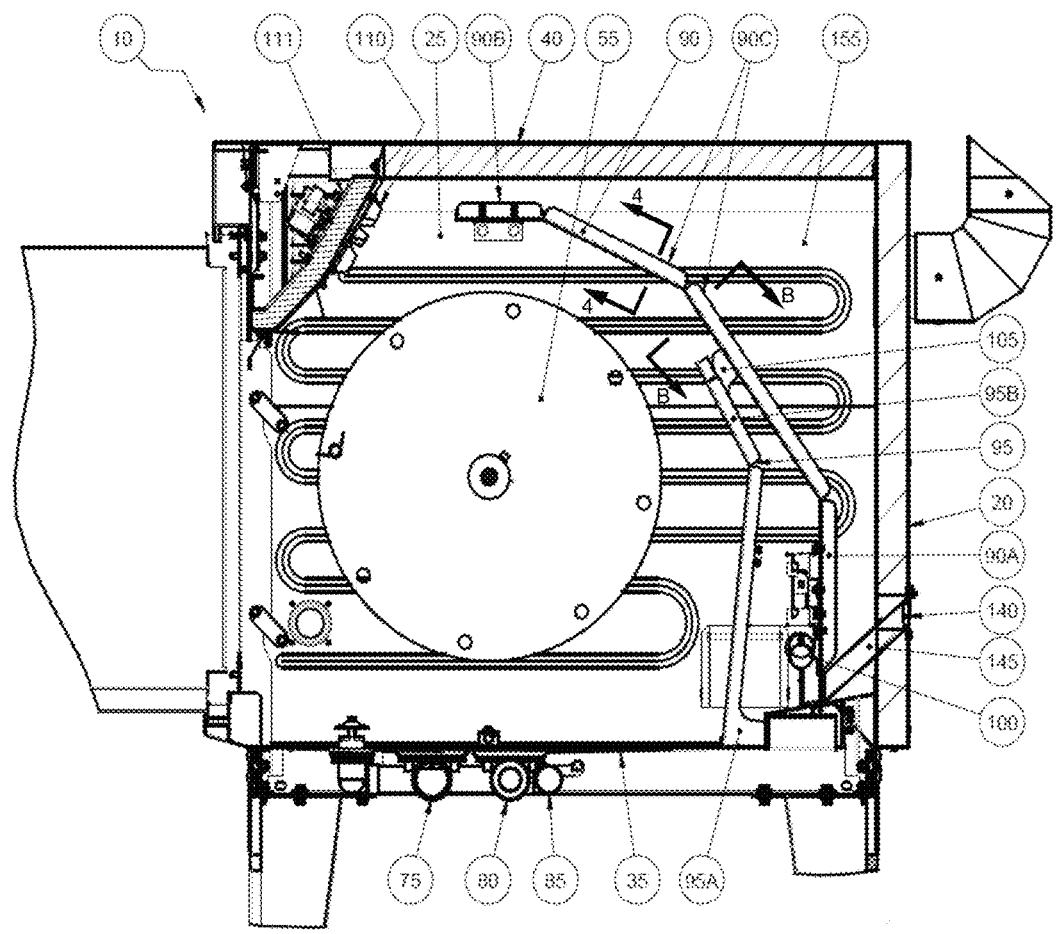
FIG. 3A depicts a sectional view of the cooking apparatus as taken along line 3-3 in FIG. 2A.

FIG. 3A is a view of FIG. 2A, taken along line 3-3. As can be seen in FIG. 3A, a hot air deflector panel 90 is spatially disposed from the back wall 20. The hot air deflector panel 90 spans between the first sidewall 25 and the second sidewall 30 so as to contact the first and second side walls in an uninterrupted continuous manner. The hot air deflector panel 90 is comprised of three segments: a first segment 90a that is substantially parallel to the back wall 20; a second segment 90b that is substantially parallel to the ceiling 40 and positioned superior to the first segment; and at least one angled segment 90c that connects the first segment 90a to the second segment 90b, such that the angled segment is positioned between the first and second segment. Preferably, the hot air deflector panel is of single body construction so as to minimize air gaps between the segments and to minimize heat loss. The hot air deflector panel could be composed of multiple, distinct segments.

As depicted in FIG. 3A, there is a plurality of angled segments, with the figure showing two angled segments 90c for illustrative purposes only. The hot air deflector panel 90 is joined to the first sidewall 25 and the second sidewall 30 either permanently, such as through welding or riveting, or reversibly, such as through a threaded attachment, locking tabs, or a tongue and groove configuration.

Spatially, and medially disposed from the hot air deflector panel 90 is a webbing acting as an air shield 95. The air shield 95 can be a single piece, or could define several pieces. In an embodiment of the invention, the shield 95 comprises two pieces as left and right halves which can be completely removed from the interior of the oven, or else in hingeable communication the sides, or floor of the oven.

The webbing (air shield 95) spans between the first sidewall 25 and the second sidewall 30 and extends upwardly from the floor 35. Similar to the hot air deflector panel, the air shield 95 is joined to the first sidewall 25 and the second sidewall 30 either permanently or reversibly. The air shield 95 is also joined permanently or reversibly to the floor 35. The air shield 95 is comprised of a first region 95a that is parallel to the first segment 90a of the hot air deflector panel 90 and a second region 95b that is substantially parallel to at least a portion of an angled segment 90c of the hot air deflector panel 90.

Figure 3B:
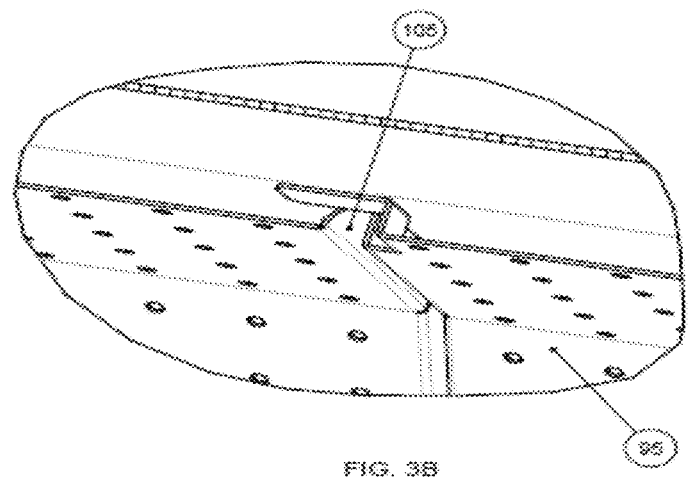
FIG. 3B depicts an embodiment of the support member between the air shield and the air deflector panel, in accordance with features of the present invention.
Figure 5:
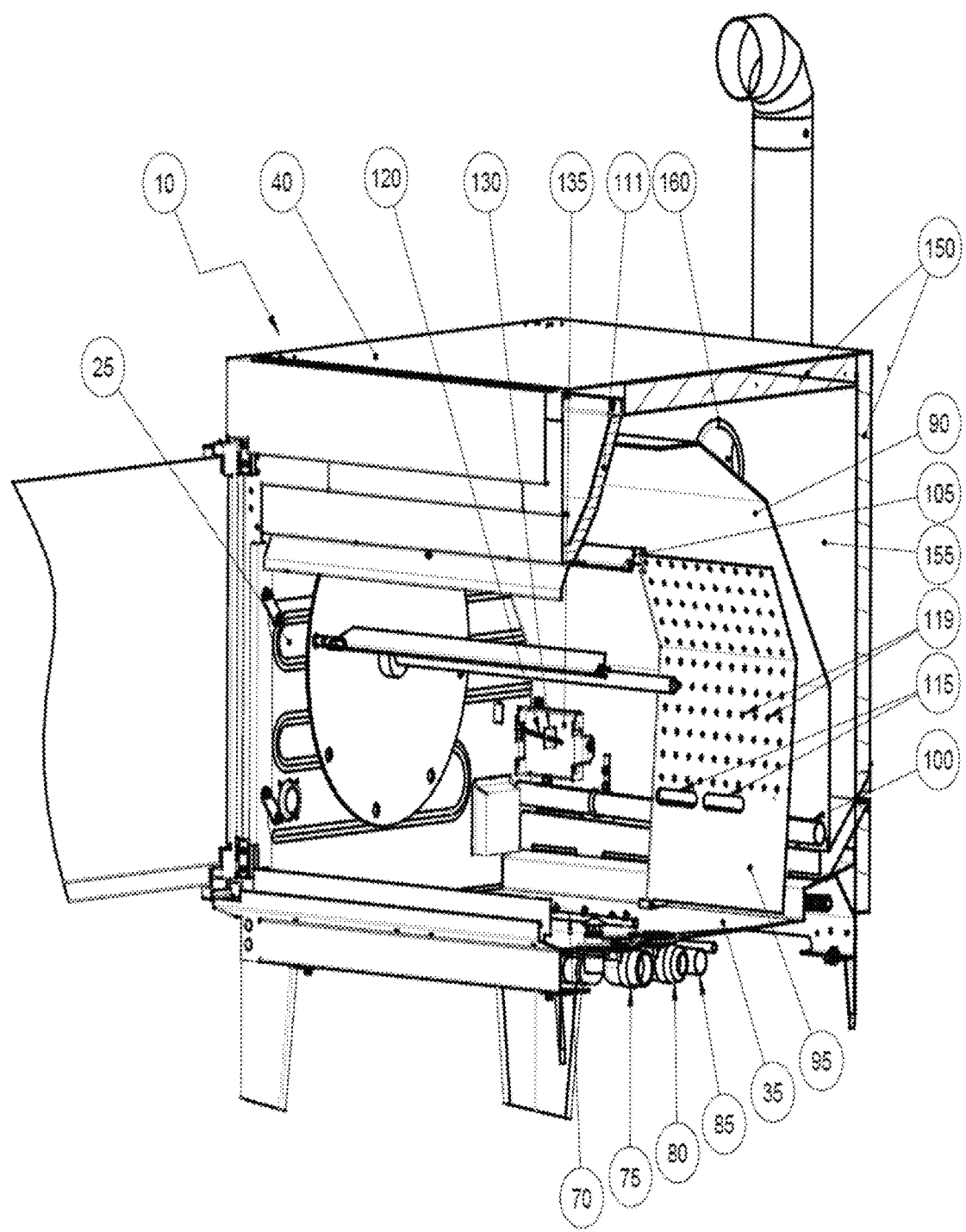
FIG. 5 another perspective view of the interior of the oven in which the flame heating element is partially exposed.

Extending from the first sidewall 25 toward the second sidewall 30 and disposed between the hot air deflector panel 90 and the air shield 95 is an open flame burner manifold 100. The manifold 100, as depicted in FIGS. 3 and 5, is hollow, elongated member adapted to receive fluid fuel. Longitudinally extending, upwardly facing surfaces of the elongated member define a plurality of ports 101 facing upwardly (i.e., towards the ceiling 40). The flame heating element 100 combusts liquid or gaseous carbon fuels passing through a lumen formed by the elongated member such that, upon ignition, flames 103 burn from each of the ports. The burning of fuel in the cooking apparatus provides the heat necessary to cook the food on the rotating assembly.

The cooking apparatus can burn a variety of fuels, including natural gas, propane gas, and liquid petroleum gas, among others. The fuel gas is typically supplied via an existing gas line on the premises, but it could also be supplied via a portable tank.

The placement of the air shield 95 and hot air deflector panel 90 along and parallel to longitudinally extending, laterally facing surfaces of the flame manifold 100 creates a plenum to direct the air upwardly and into the main recess of the cooking apparatus 10. Air heated from the combustion reaction at the flame heating element 100 travels upwardly through the plenum. The air is directed towards the upper, front region of the cooking cavity by the angled segment 90c and second region 95b. In one embodiment, the dimensions of the plenum are maintained using a support member 105. The support member 105 is a rigid spacer that runs at least intermittently from the area just above the flame element 100 into the angled segments 90c and second region 95b of the hot air deflector 90 and air shield 95. In an embodiment of the invention depicted in FIG. 3B, the support member 105 defines a frame with an aspect ratio similar to the aspect ratio of the opening formed by angle segments 90c and second region 95b.

Figure 4:
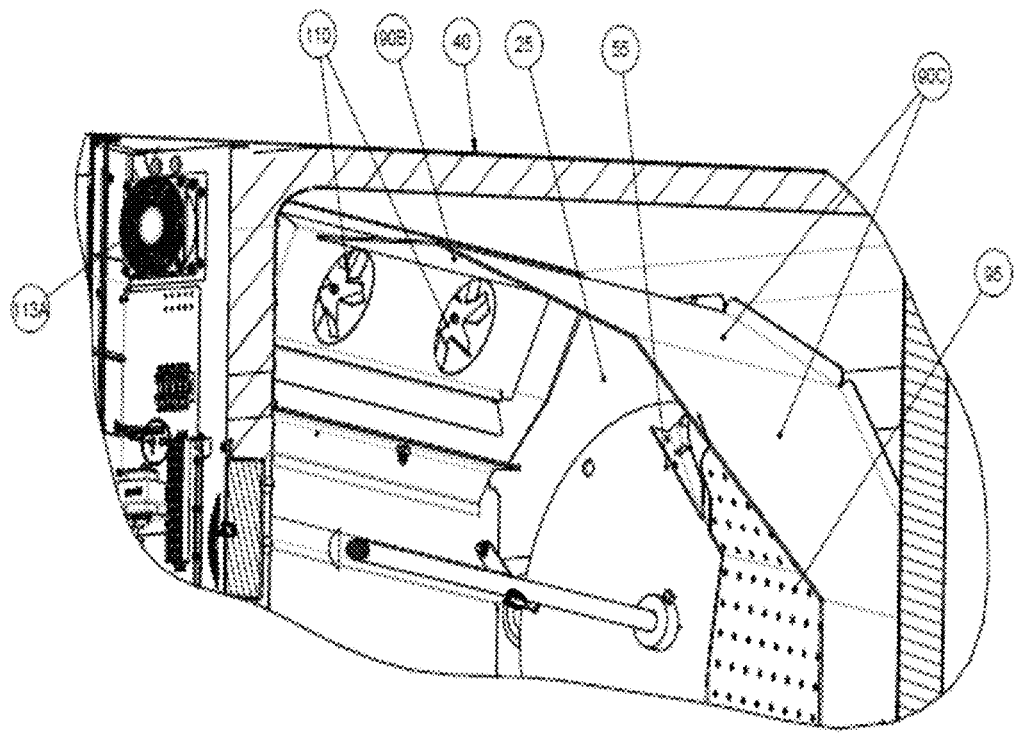
FIG. 4 depicts a view of the convection fans on the interior of the oven.

Located in the interior of the cooking apparatus 10 in a region proximal to where the front wall 15 and ceiling 40 intersect is at least one air movement device, such as a fan 110. As can be seen in FIG. 4, which is a view of FIG. 3A taken along line 4-4, there are two fans 110 used to circulate air within the cooking apparatus 10. The fan 110 is mounted on an insulating support 111 which is angled to direct air, emerging from the hot air deflector 90, towards the lower, middle, and front region of the cooking apparatus 10. In an embodiment of the invention, the fan is positioned such that the hot air is directed away from the front door of the device and toward the back of the oven the user sees from the front of the device. In this configuration, the fan 110 blows hot air over the food onto the rotating assembly 55, constantly removing cold air from the surface of the food and replacing it with warm air. As discussed supra, in a prior art cooking apparatus, this forced convection air circulation would destabilize the flames of the flame heating element to the point of extinguishment. In the presently invented cooking apparatus, however, the air shield 95 protects the flame from destabilization.

The fans 110 can be controlled to operate at variable speeds. This allows the operator to manipulate the cooking rate and browning of the food in the rotisserie. Each fan 110 can spin at a rate of between approximately 1300 rpm and approximately 2600 rpm, which moves approximately 250 to approximately 500 liters of air per minute.

The insulating support 111 ensures that the fan motors are not overheated from the high temperatures in the cooking apparatus 10. Further, the angle of the insulating support 111 not only directs the air pushed by the fan, but it also provides a void space that can be cooled by air from outside the rotisserie. As can be seen in FIG. 2A, the front wall 15 features an opening 112 through which outside air can flow. As shown in FIGS. 1 and 3, this opening is typically covered with a screen, such as a louvered vent 113.

FIG. 4 depicts a cooling fan 113A to draw air from outside of the oven and into the circulating fan cavity. The fan 113A is positioned on a side wall of the oven that opposes the wall supporting the louvered vent 113. This configuration assures that outside air is drawn across the componentry of the circulating fans to maximize cooling of said componentry. Suitable cooling fan is one that can move between approximately 25 and approximately 250 cubic feet per minute, preferably between approximately 50 and about 150 cfm, and typically about 100 cfm.

In another embodiment of the present invention, air circulation is further improved by including a plurality of windows 115 in the air shield 95. As can be seen in FIG. 2A, there are four windows 115, and each window 115 is shaped as a rounded rectangle; however, more or less windows could be used, and the shape of the windows could be a multitude of other shapes. The windows provide visibility to the flame to assure the user that the burner 100 is fully lit across its length. In an embodiment of the invention, the windows 115 are positioned on the air shield 95 such that they are approximately 1 inch above the ports on the flame heating element 100.

Figure 2B:
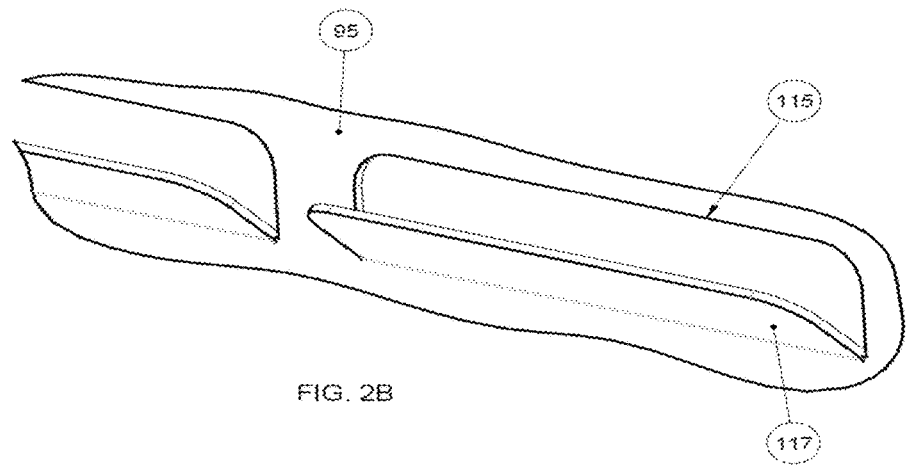
FIGS. 2B-D depict close-up views of embodiments of a flame theater window, in accordance with features of the present invention.
Figure 2C:
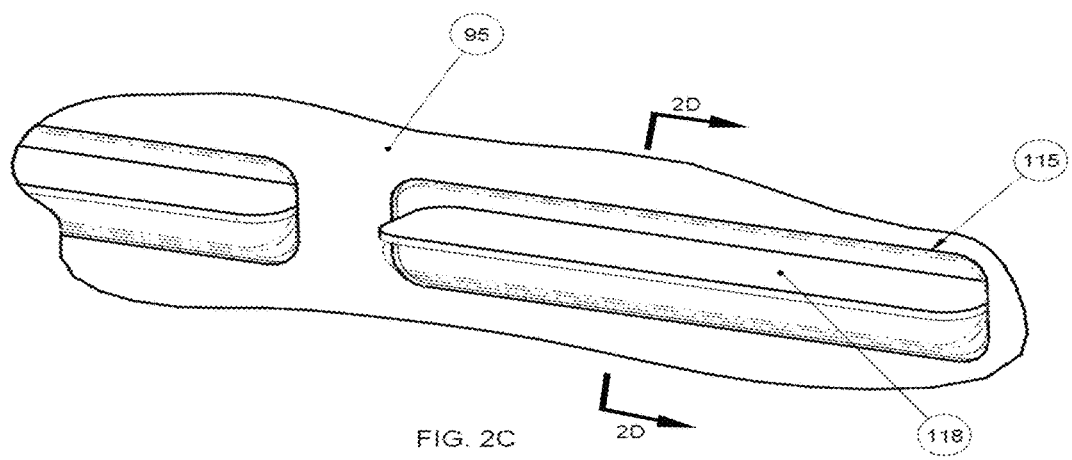
Figure 2D:
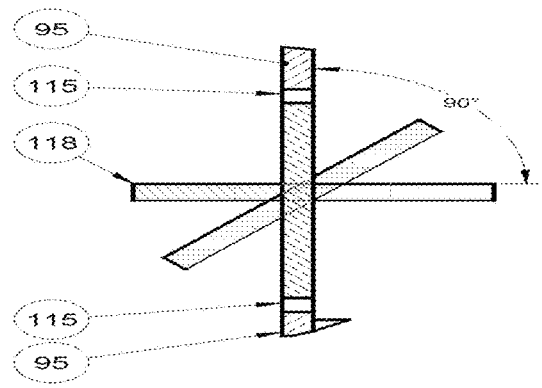

As can be seen in FIG. 2B, the windows 115 can feature a protruding lip 117 to provide additional protection against flame extinguishment. The lip 117 prevents the moving air from entering the window 117 at an angle such that the air can contact the base of the flame. The lip 117 as depicted in FIG. 2B is on the floor side of the window 115, but the lip 117 could also be on the ceiling side of the window. Additionally, as shown in FIG. 2C, window 115 be covered with a louver 118 such that air can only flow upwardly through the opening, greatly diminishing the possibility of extinguishing the flames. In one embodiment depicted in FIG. 2D, the louver 118 can rotate within the window from 0° (vertical position, window closed) to 90° (horizontal position).

Aside from the flame visibility windows 115 discussed supra, other smaller apertures 119 are optionally provided through the webbing 95. These apertures provide additional means for heat exchange between the plenum and the main cooking cavity. Further, these apertures 119 can be configured to provide a visual impact to the customer, such that the apertures can be formed in the name of the food purveyor, the device manufacturer etc. Given the large number of these small apertures, a more thorough mixing of heat can be realized, particularly if the medially (i.e. inwardly) facing surface of the hot air reflecting surface 90 is polished to a high reflective gloss. The gloss will facilitate redirection of heat and light back toward the main cooking cavity and also provide added theatre by back lighting the design defined by the plurality of small apertures, 119.

Figure 6:
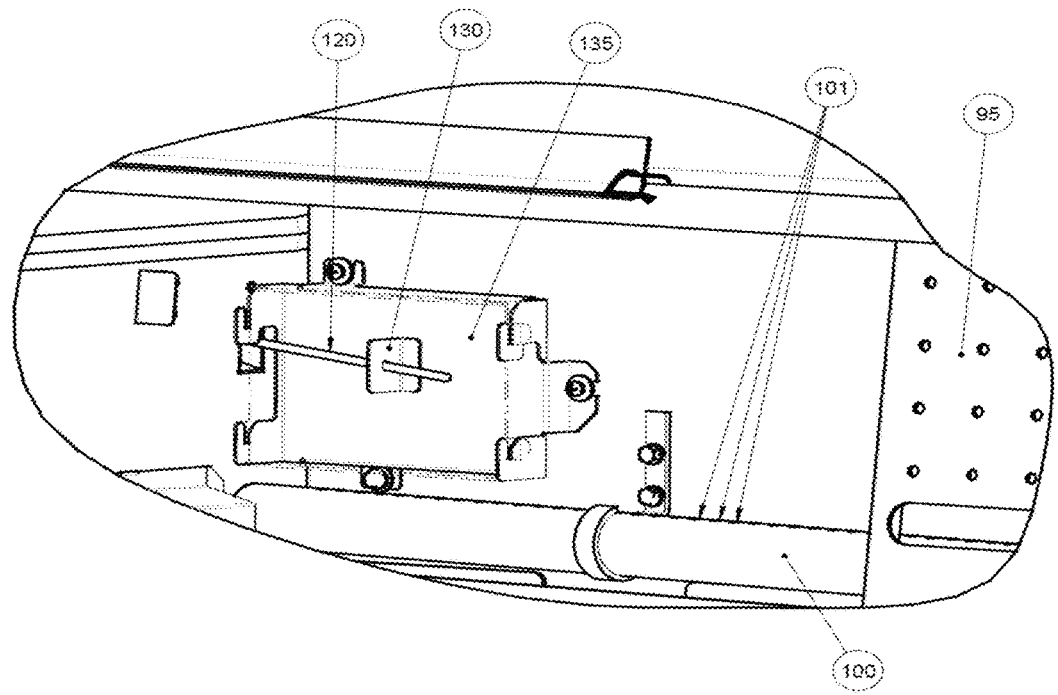
FIG. 6 depicts a close-up view of the flame heating element.

FIG. 5 provides a detail view of the area in the plenum near the flame heating element 100. A flame sensor 120 protrudes from the first sidewall 25 over the flame heating element 100. A variety of flame sensors could be used as part of the present invention. As depicted in FIG. 6, the flame sensor 120 comprises a thermocouple 125 to detect fluctuations in flame temperature as a means to determine if a flame is present. The flame sensor 120 is held a fixed distance from the flame heating element 100 with a support 130. An option feature has the support 130 locating the thermocouple in a plurality of positions, the optimal position determined empirically by the user. The thermocouple 125 is surrounded by an air shroud 135 so as to prevent stray air currents from causing the flame to waver or otherwise become erratic, which could create inaccurate readings. In an embodiment of the invention, the burner temperature is evaluated over time to determine if a flame out situation exists. The applicant's concurrently pending patent application (Pub. No. US 2014/0212821A1), incorporated herein by reference, provides such a $\Delta T/t$ protocol.

As depicted in FIG. 3A, a secondary air inlet 140 is provided in the exterior surface of the back wall 20. The secondary air inlet 140 is a transverse, elongated slit that extends along at least a portion of the width of the back wall 20. In an embodiment of the invention, the secondary inlet runs along the entire length of the back wall and is adjustable from about ⅛" to about 1.5 inches in height. An air channel 145 connects the air inlet 140 to the region below the flame heating element 100 so as to establish fluid communication between the ambient environment exterior of the oven and the flame manifold. In this way, air from outside the cooking apparatus 10 is drawn into the oven to replenish the oxygen in the cooking cavity. This air movement is induced via differential pressure. This air channel allows for all other aspects of the unit (except for the fan fresh air portal) to be substantially sealed from the ambient environment.

As can be seen in FIG. 5, the walls of the cooking apparatus are insulated. Insulating material 150 is shown between the back wall 20 and the hot air deflector panel 90 and between the ceiling 40 and the hot air deflector panel 90. Additionally, the angle of the hot air deflector panel 90 creates a void region 155 that provides further insulation. The angle of the hot air deflector panel 90 also decreases the size of the heated region of the cooking cavity. In this way, hot air is not wasted in areas of the rotisserie that do not contain food items for cooking. Near the top of the back wall 20 is a hole 160 to serve as a means of egress (e.g. a chimney) for steam, vaporized oil, and other gases generated during the cooling process.

Using a cooking apparatus as described above, the inventors have experienced a 30 percent reduction in cooking time. Temperatures ranging from about 190° C. and about 260° C. are obtained with the invented device.

Besides uniformity of cooking temperature, the aesthetic characteristics of the cooked chickens are greatly enhanced over conventional rotisseries that use baskets. Specifically, the inventors have been able to achieve an even browning over the entire surface of the chicken. Thus, the present invention provides a cooking apparatus that combines the time-saving features of a basket rotisserie with the beneficial aspects of convection cooking while also enhancing the aesthetic quality of the finished product.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

A property right or privilege is claimed in the invention as defined in the following claims:

1. A device for cooking food, said device comprising:
    a cooking cavity, wherein the cavity is defined by a front wall, a back wall that opposes the front wall, two opposing side walls, a ceiling, and a floor that opposes the ceiling;
    a substrate for supporting a food item, the substrate substantially enclosed by the cavity;
    an air deflector panel spanning between the two opposing side walls, said air deflector panel comprising a first segment proximal to the back wall, a second segment proximal to the ceiling, and at least one angled segment that joins the first segment and the second segment;
    a webbing defining a plurality of apertures positioned proximal to but medially displaced from the air deflector panel, wherein the webbing spans between the two side walls and extends from the floor, and wherein the webbing comprises a first region that is parallel to the first segment of the air deflector panel, a second region that is parallel to at least a portion of the angled segment of the air deflector panel, and;
    an open flame heating element located between the air deflector panel and the webbing; and
    at least one air movement device located proximal to a region in which the front wall and ceiling intersect.

2. The device of claim 1, wherein a secondary air inlet is located on the back wall and transports air to the space between the air deflector panel and webbing and under the open flame heating element.

3. The device of claim 2, wherein the back wall has a longitudinal axis defining its length, and wherein the secondary air inlet is a channel extending along the length of the back wall.

4. The device of claim 1, wherein a flame sensor is placed between the air deflector panel and the webbing and proximal to the flame heating element.

5. The device of claim 1, wherein the substrate for supporting a food item is a plurality of baskets.

6. The device of claim 1 wherein the air deflector panel further comprises a medially facing surface, and wherein said medially facing surface is polished to a high reflective gloss.

7. The device of claim 6 wherein light from the open flame heating element is reflected from the medially facing surface of the air deflector panel and backlights the plurality of apertures defining the webbing.

8. The device of claim 1 wherein the open flame heating element heats the webbing and the webbing radiates heat into the cooking cavity.

9. The device of claim 1 wherein the at least one air movement device is angled to direct air towards a medial portion of the cavity and onto the substrate for supporting a food item.

* * * * *